United States Patent
Patissou et al.

(10) Patent No.: US 8,095,017 B2
(45) Date of Patent: Jan. 10, 2012

(54) FULLY OPTICAL DEVICE FOR BREAKING DOWN THE DYNAMIC RANGE OF AN OPTICAL SIGNAL AND SYSTEM FOR MEASURING THE SIGNAL USING THE DEVICE

(75) Inventors: Loic Patissou, Gradignan (FR); Philippe Gibert, Audenge (FR); Sebastien Jonathas, Merignac (FR)

(73) Assignee: Commissariat a l'energie Atomique, Paris (FR)

( * ) Notice: Subject to any disclaimer, the term of this patent is extended or adjusted under 35 U.S.C. 154(b) by 650 days.

(21) Appl. No.: 11/716,411

(22) Filed: Mar. 8, 2007

(65) Prior Publication Data

US 2007/0286604 A1  Dec. 13, 2007

(30) Foreign Application Priority Data

Mar. 31, 2006  (FR) ...................... 06 51141

(51) Int. Cl.
*H04B 10/00* (2006.01)
*H04J 14/00* (2006.01)
(52) U.S. Cl. ............... 398/161; 398/53; 398/102
(58) Field of Classification Search .......... 398/53, 398/102, 161
See application file for complete search history.

(56) References Cited

U.S. PATENT DOCUMENTS

| | | | | |
|---|---|---|---|---|
| 5,191,626 | A | * | 3/1993 | Stern ............................ 385/24 |
| 5,861,965 | A | * | 1/1999 | Koren et al. .................. 398/75 |
| 2004/0202471 | A1 | * | 10/2004 | Bethea ......................... 398/53 |
| 2004/0208555 | A1 | * | 10/2004 | Pau et al. ..................... 398/56 |

OTHER PUBLICATIONS

Seach Report, FA 676755, FR 0651141, 3 pgs, (Sep. 20, 2006).
Westlund, Mathias et al., "Fiber-Based All-Optical Sampling System With Simultaneous-17 dBm Sensitivity, 1 ps Temporal Resolution and 60 nm Optical Bandwidth", Optical Fiber Communication Conference, 2005. Technical Digest. OFC/NFOEC Anaheim, CA USA Mar. 6-11, 2005, Piscataway, NJ, USA, IEEE, pp. 223-225, XP010831704, ISBN: 1-55752-783-0.
Gerbe, V. et al., "Realisation and Characterization of an Electrical Single Pulse Ultra-Fast Optosampler", SPIE Ultrahigh- and High-Speed Photography, Videography and Photonics '94, vol. 2273, (Jul. 27, 1994), pp. 150-155 XP002399786.

* cited by examiner

*Primary Examiner* — Nathan Curs
(74) *Attorney, Agent, or Firm* — Nixon Peabody LLP

(57) ABSTRACT

Fully optical device for breaking down the dynamic range of an optical signal and system for measuring the signal, using this device. This device comprises fully optical means to break down this dynamic range.

19 Claims, 2 Drawing Sheets

FULLY OPTICAL DEVICE FOR BREAKING DOWN THE DYNAMIC RANGE OF AN OPTICAL SIGNAL AND SYSTEM FOR MEASURING THE SIGNAL USING THE DEVICE

CROSS-REFERENCE TO RELATED PATENT APPLICATION OR PRIORITY CLAIM

This application claims the benefit of a French Patent Application No. 06-51141, filed on Mar. 31, 2006, in the French Intellectual Property Office, the disclosure of which is incorporated herein in its entirety by reference.

FIELD OF THE INVENTION

This invention relates to a device for breaking down the dynamic range of an optical signal.

This device is particularly applicable to the field of metrology. In particular, it can be used to measure an optical signal with a large dynamic range, and more particularly the time form of an optical pulse with a large dynamic range (up to 10 000, or even more), for example using an oscilloscope or a digitizer, without degrading its intrinsic performances.

BACKGROUND OF THE INVENTION

At the present time, digitizers and oscilloscopes are being developed essentially by increasing the acquisition pass band, in particular to satisfy telecommunication needs. This increase usually takes place at the detriment of the measurement dynamic range. Thus, an oscilloscope with a pass band of 6 GHz only has an effective dynamic range of 3.5 bits, namely about 11.

It then becomes impossible to measure a signal with a dynamic range greater than the dynamic range of an oscilloscope with sufficient precision (signal to noise ratio), on the same input and the same rated capacity of this oscilloscope.

The device for breaking down the dynamic range according to this invention can overcome such a lack of dynamic range.

When associated with a simple detector, this device can reconstitute an optical pulse with a large dynamic range, for example 3000 or more, by breaking this pulse down into several parts.

Consequently, all other performances of the measurement system, particularly the pass band, and a sufficient measurement precision in terms of metrology are maintained. Furthermore, the device makes it possible to easily reconstitute the pulse envelope because each part of this pulse is described by the same transfer function.

Various devices are already known for increasing the measurement dynamic range by breaking down the optical signal to be measured. But all these known devices are based on an electrical breakdown:

either they use a photo detector and breakdown the electrical signal provided by this photo detector using T separators, or they breakdown the optical signal and use several photo detectors.

The major disadvantage of these known devices lies in the fact that they require that a signal filtered by different transfer functions has to be reconstituted, since they use several channels of a digitizer or an oscilloscope and possibly several photo detectors.

Furthermore, when breaking down a dynamic range using an electrical device, the use of very long electrical cables degrades the time performances of the acquisition system.

Therefore, it is very difficult to reconstitute the optical signal and the performances achieved on the global template of the signal are limited.

SUMMARY OF THE INVENTION

The purpose of this invention is to overcome the above mentioned disadvantages.

This invention does this using a fully optical breakdown.

Precisely, the purpose of this invention is a device for breaking down the dynamic range of an incident optical signal, this device being characterized in that it comprises fully optical means capable of breaking down this dynamic range.

According to one preferred embodiment of the device according to the invention, the fully optical breaking down means comprise:

fully optical means of division capable of dividing the incident optical signal into N+1 optical signals S0, S1, S2, ..., SN, where N is an integer equal to at least 1, each of these N+1 optical signals having an attenuation with respect to the incident optical signal, fully optical means of making a time offset, capable of offsetting the optical signals S1 to SN in time with respect to the optical signal S0, and fully optical multiplexing means capable of multiplexing the optical signals offset in time.

Preferably, the fully optical division means comprise first optical fiber couplers.

These first optical fiber couplers are preferably single-mode optical fiber couplers.

Preferably, the fully optical time offset means comprise N optical fibers.

These N optical fibers are preferably single mode.

Preferably, the fully optical multiplexing means comprise second optical fiber couplers.

These second optical couplers are preferably single mode optical fiber couplers.

This invention also relates to a system for measuring an optical signal, this system comprising:

the device for breaking down the dynamic range of an incident optical signal according to the invention, means of photo detection of the optical signal for which the dynamic range was broken down by this device, these photo detection means being capable of providing an electrical signal representative of the optical signal for which the dynamic range was broken down, and electronic means of processing this electrical signal, capable of reconstituting the incident optical signal.

Preferably, the electronic processing means include an oscilloscope or a digitizer.

BRIEF DESCRIPTION OF THE DRAWINGS

This invention will be better understood after reading the description of example embodiments given below, purely for guidance and in no way limitatively, with reference to the appended drawings, wherein.

DETAILED DESCRIPTION OF PARTICULAR EMBODIMENTS

According to the invention, a device for breaking down the dynamic range of an optical signal such as an optical pulse comprises:

a section for breaking down the dynamic range of the pulse by attenuation of parts of this pulse, and a multiplexing and time offset section comprising optical fibers with make it possible to offset the different parts of the pulse in time.

According to the invention, the dynamic range of the pulse is broken down into M slices, where M is an integer equal to at least 2. The number of slices fixes the architecture of the breakdown device that varies as a function of the following parameters:

the measurement dynamic range to be achieved, the required measurement precision, and the time delay between the broken parts of the pulse.

Originally, this device according to the invention makes it possible to acquire different broken parts of the pulse by means of a single photo detector, on a single channel and therefore with the same rated capacity of an oscilloscope or a digitizer. Thus, reconstruction of the complete optical signal is much more precise.

Firstly let us consider the breakdown of the dynamic range.

For this breakdown, we must define an operating point on the photo detector such as a photodiode, so that there is always a sufficient signal to noise ratio without ever exceeding the photodiode damage threshold, for all acquisitions.

The adjustment is made by fixing the output level of the photodiode to measure the peak at 80% of the rated capacity of the oscilloscope or the digitizer, to overcome differences between the output energy and the expected energy.

Then, using optical fiber couplers and preferably single mode fiber couplers, the different parts of the pulse around this operating point are more or less attenuated to acquire them. The operation is repeated as many times as necessary (M slices) depending on the dynamic range of the pulse to be acquired.

Figure 1:
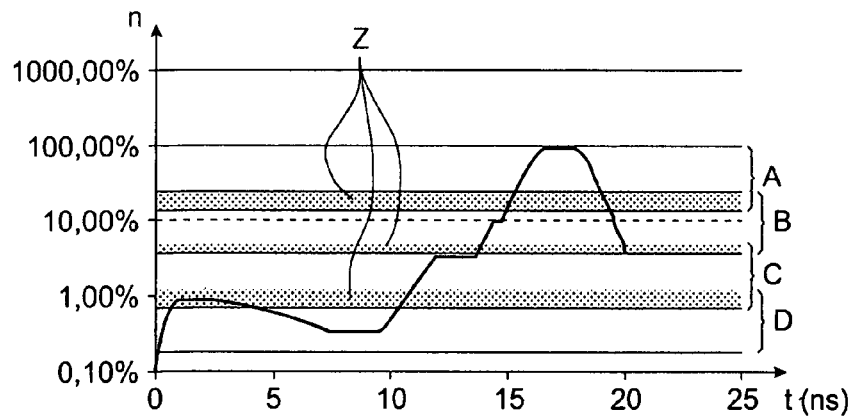
FIG. 1 is an illustration of the principle for breaking the dynamic range of an optical pulse into several levels, as is done in this invention.

An example of a dynamic range breakdown with four levels (M=4) is illustrated in FIG. 1.

FIG. 1 shows an optical pulse I for which the level n is represented as a function of the time t, expressed in nanoseconds. The level n extends from 0.10% to 100.00%.

In this example, the pulse, or more precisely the dynamic range of the pulse, in other words the interval [0.10%; 100.00%], was broken down into four parts A, B, C and D as shown in FIG. 1.

As can be seen, each of these pulse parts overlap with the next part. The three resulting overlapping zones Z are used to reconstitute the complete optical signal.

Note that part A extends as far as 100.00% while part D begins not exactly at 0.10% but slightly higher than this value because the signal to noise ratio is not sufficiently good to use these points to reconstitute the signal. In other words, the precision of the signal is not sufficient because this signal is in the background noise of the measurement system.

We will now consider multiplexing.

The different parts of the pulse are delayed by means of optical fibers which are preferably single mode, so that they can be acquired on the same channel. The lengths of these fibers depend directly on the pulse duration and the time required between the acquisition of one part of the pulse and acquisition of the next part.

Figure 2:
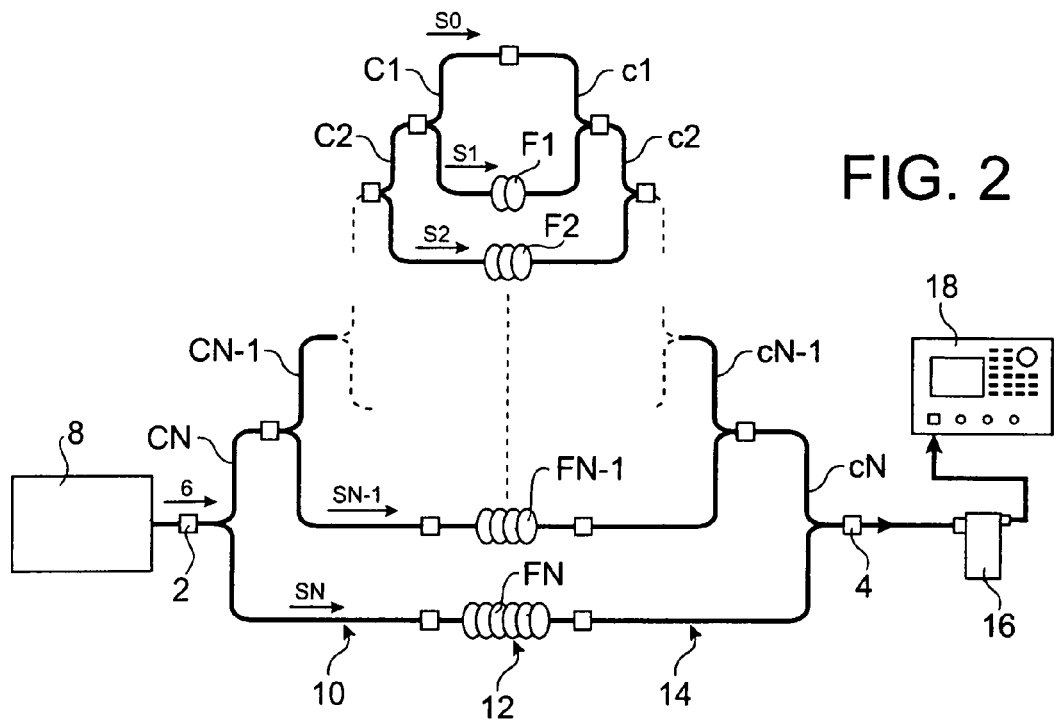
FIG. 2 is a diagrammatic view of a particular embodiment of the device for breaking down the dynamic range according to the invention, FIG. 3 diagrammatically shows the result of a breakdown of the dynamic range made in accordance with the invention.

A dynamic range breakdown device according to the invention is shown diagrammatically in FIG. 2.

This device comprises an input 2 and an output 4. The input 2 will receive a light pulse 6 emitted by a light source 8 such as a laser.

This device is composed of fully optical means to breakdown the dynamic range of the light pulse 6. These fully optical means comprise division means 10, time offset means 12 and multiplexing means 14.

The division means 10 are used to divide the pulse 6 into N+1 optical signals S0, S1, S2, . . . , SN (where N is an integer greater than or equal to 1) that have an attenuation with respect to the pulse 6.

The time offset means 12 make it possible to offset S1, S2, . . . , SN in time with respect to S0.

The multiplexing means 14 make it possible to multiplex the signals offset in time.

The division means 10 comprise N optical fiber couplers C1, C2, . . . , CN−1, CN, each coupler having one input (or input port) and two outputs (or output ports). These couplers could be made starting from multi-mode optical fibers but are preferably made from single mode optical fibers.

The input to the coupler Ci is optically connected to one of the two outputs from the coupler Ci+1, for all values of i varying from 1 to N−1, and the input to coupler CN corresponds to input 2 of the device.

The signals S0 and S1 are output by the two outputs from the coupler C1 and for all values of i varying from 1 to N, the signal Si is output by one of the two outputs from the coupler Ci.

Given a light power Pi available at the input to the coupler Ci, this coupler outputs light powers $x_i P_i$ and $Y_i P_i$ on the two output ports respectively, for all values of i varying from 1 to N, where $x_i + y_i$ is equal to 100%.

For each of these couplers, this power distribution on the output ports is chosen as follows:

The sum of the attenuations of each coupler, as seen by a pulse, must enable an optical signal power compatible with operation of the photodiode 16 included in the system shown in FIG. 2, that will be discussed further later.

The time offset means 12 comprise N optical fibers F1, F2, . . . , FN−1, FN. These fibers could be multi-mode, but are preferably single mode. One end of the fiber F1 is connected to the output from coupler C1 that outputs the signal S1 and one end of the fiber Fi is connected to the output from coupler Ci, which is not connected to coupler Ci−1 and which outputs the signal Si for all values of i varying from 2 to N.

The length Li of the fiber Fi for any value of i varying from 1 to N, is determined such that there is no crosstalk between the N pulses to be analyzed and the pulses parts generated by each of the couplers C1 to CN.

The multiplexing means 14 comprise N optical fiber couplers c1, c2, . . . , cN−1, cN, each coupler having one output and two inputs. 50-50 couplers type are used in the example; however, other types could be used.

Furthermore, it is preferable if couplers c1 to cN are made from single mode fibers, but it would also be possible to use couplers made from multi-mode fibers.

The two inputs of the coupler c1 are respectively connected to the output from the coupler C1 that outputs the signal S0, and to the other end of the fiber F1; the two inputs of the coupler ci are respectively connected to the output from the coupler ci−1 and to the other end of fiber Fi, for all values of i varying from 2 to N; and the output from the coupler cN corresponds to the output 4 from the device.

FIG. 2 also shows a measurement system according to the invention. This system includes the device that has just been described, a photodiode 16 that is optically connected to the output 4 to receive the multiplexed optical signal which is output from this output, and an oscilloscope 18 (or a digitizer) of which the input receives the electrical signal supplied by the photodiode 16 when the photodiode receives the multiplexed signal.

Figure 3:
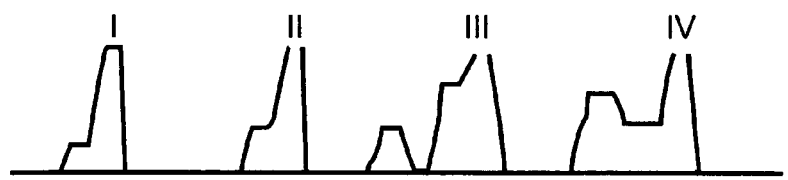

For example, the result of a dynamic range breakdown into four parts or levels, by a device according to the invention, is shown diagrammatically in FIG. 3.

Curves I, II, III and IV of this FIG. 3 correspond to parts like parts A, B, C and D respectively in FIG. 1. Furthermore, curve I represents the pulse peak; curve II represents the bottom of the pulse peak; curve III represents the top of the pre-plateau of the pulse; and curve IV represents the bottom of the pre-plateau of the pulse.

As an example, consider the following description of a device to breakdown the dynamic range of a light pulse emitted by a power laser according to the invention.

We want to measure the time shape of this pulse that has a dynamic range of 3000 in the most pessimistic case.

Figure 4:
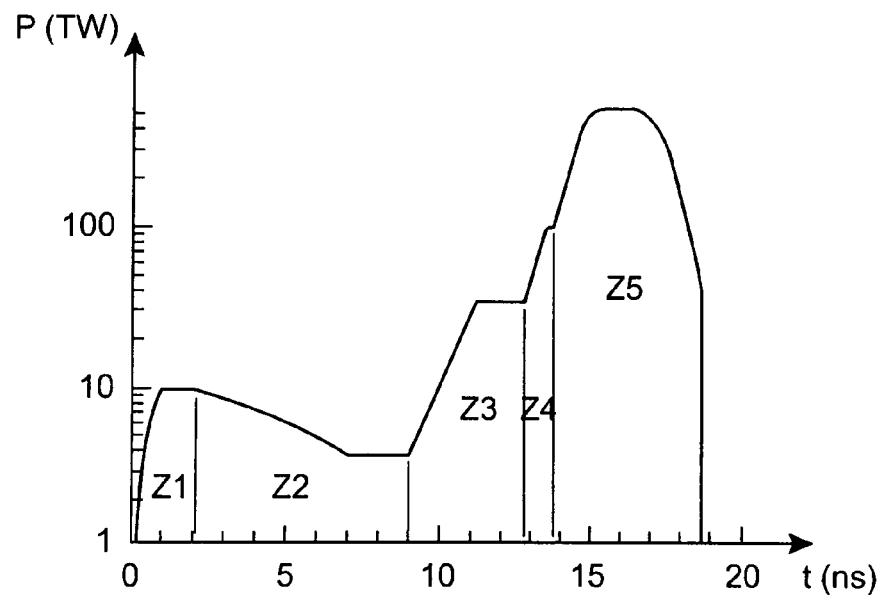
FIG. 4 shows the time profile of a light pulse emitted by a power laser.

This time shape or time profile is shown in FIG. 4, and corresponds to the curve representative of variations of the power P (in TW) of the pulse as a function of the time t (in ns). FIG. 4 delimits five zones Z1 to Z5 between this curve and the time axis.

If it is required to acquire the pre-plateau of the pulse (zones Z1 and Z2) using a photodiode, the first step is to determine an operating point of the photodiode such that the signal to noise ratio of the pre-plateau satisfies the required precisions.

In this example, it is decided to use a fibred and amplified photodiode with a saturation threshold of 8V. The destruction threshold for this type of photodiode is equal to three times the saturation threshold.

The following fixed data are defined to size the dynamic range breakdown device:
  total noise (particularly digitization noise and photodiode noise): 8% of the oscilloscope rated capacity at 2σ, where σ represents the standard deviation of the noise value,
  peak/pre-plateau contrast: 100, and
  photodiode saturation level: 8 V with amplified photodiode.

In addition, the parameters considered are:
  the acquisition rated capacity of the oscilloscope that is connected to the photodiode to process the electrical signal output by this diode when it receives a light signal,
  balancing of the transmission of each of the optical couplers used,
  overlap of breakdown zones, and
  the operating point of the photodiode.

The adjustment is made by fixing the output level of the photodiode for the peak measurement at 80% of the rated capacity, to compensate for differences of the supplied energy with respect to the expected energy. This makes it possible to have a safety margin.

It is preferable to have an overlap of the different pulse breakdown zones to optimize reconstruction of the time signal. This makes it possible to reconstruct this signal with a good precision, using a computer processing.

Figure 5:
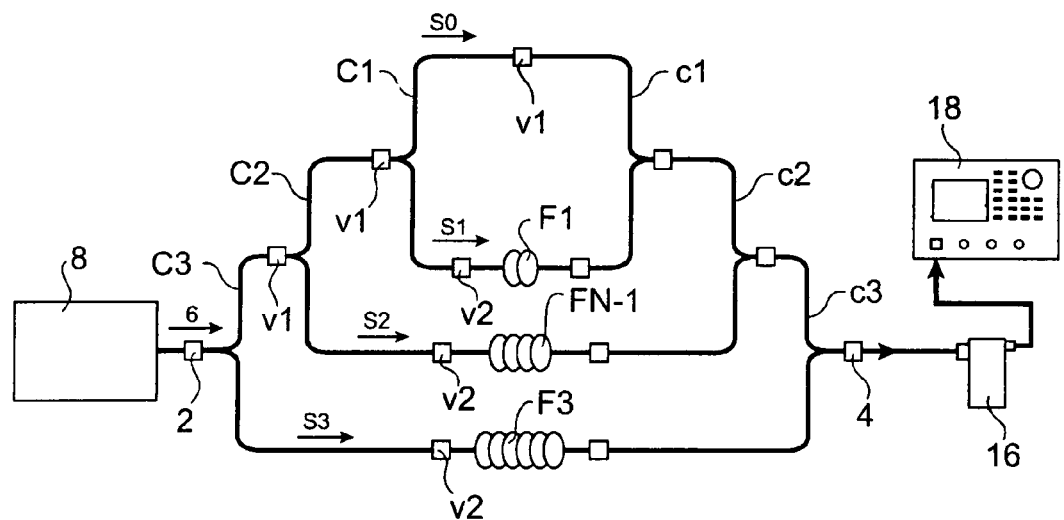
FIG. 5 is a diagrammatic view of an example device according to the invention.

In the example considered, the dynamic range breakdown device is a device for breaking down into four levels, using three optical couplers C1, C2 and C3 as shown diagrammatically in FIG. 5.

We will not describe this figure. We will simply mention that it corresponds to FIG. 2 in the special case in which N is equal to 3. Therefore, in FIG. 5 notations were adapted to this value of N. Furthermore, in the example shown in FIG. 5, the source 6 is a power laser and the reference 18 represents an oscilloscope.

The optical fiber lengths F1, F2 and F3 are determined such that the four broken down pulses arrive at offset times without any crosstalk between them.

The results of the simulation of the breakdown obtained with the device in FIG. 5 are given below:
  Maximum electrical signal of the photodiode for the peak: 65 mV;
  Rated capacity: 0.01 V/division;
  maximum amplitude on the oscilloscope: 8 divisions;

|  | Coupler C1 | Coupler C2 | Coupler C3 |
|---|---|---|---|
| Output port v1 | 60% | 60% | 85% |
| Output port v2 | 40% | 40% | 15% |

| | Signal (mV)/precision at 2σ | | | |
|---|---|---|---|---|
| Pulse zone | Part 1 | Part 2 | Part 3 | Part 4 |
| Peak Z5 | 65/1.2% | 295/Saturated | 1255/Saturated | 6800/Saturated |
| Intermediate zone Z4 (20%) | 12/6.2% | 58/1.5% | 250/Saturated | 1360/Saturated |
| Intermediate zone Z3 (5%) | 3/NE | 14/6.2% | 63/1.3% | 340/Saturated |
| Pre-plateau Z1, Z2 | 0.6/NE | 3/NE | 13/6.2% | 68/1.2% |

In the above table, NE represents the parts of the pulse for which the points cannot be used because the noise is too high, and parts 1 to 4 are the four pulses resulting from the breakdown.

Such a breakdown is optimum for the following reasons:
  with this configuration, the dynamic range is completely covered in four bands, overlapping slightly to facilitate reconstruction of the signal,
  the precision for each zone enables optimum exploitation of the measurements, and
  the maximum signal at the output from the photodiode is 6.8 V (peak of pulse 4, in other words of the least attenuated pulse).

The main advantages of such a device are:
  optical breakdown of the signal on the input side of the detection system (photodiode), avoiding degrading the performances of this system,
  detection of the different parts of the pulse by the same detection system, so that the same transfer function can be obtained,
  a restrictive size because the device is simply the result of associating optical fiber couplers and optical fibers, and
  the fact that the device is based on fibred and inexpensive off-the-shelf elements for which the design is perfectly controlled.

The innovation of this device lies in the fact that it makes it possible to acquire a signal with a large dynamic range with a single detector and on a single input of an oscilloscope (or a digitizer), without changing the rated capacity of the oscilloscope. Furthermore, it makes it possible to maintain the performances of the oscilloscope, particularly its resolution.

In addition, this device is advantageously based on an optical breakdown such that all initial characteristics of the signal to be analyzed can be maintained. Besides, this device can be fully made from optical fibers.

Note also that this device makes it possible to artificially increase the dynamic measurement range of a digitizer, by optical breakdown.

What is claimed is:

1. A device for breaking down the dynamic range of one incident optical signal, the device comprising:
    passive optical means of division capable of dividing the one incident optical signal into N+1 optical signals S0, S1, S2, ..., SN having different powers, wherein N is an integer equal to at least 2, each of these N+1 optical signals having an attenuation with respect to the incident optical signal, wherein the passive optical means of division comprises optical couplers C1, C2, ... CN−1, CN, each optical coupler Ci receiving an input optical signal having a power Pi and outputting two optical signals having powers xiPi and yiPi, respectively, with xi+yi being substantially 100% and xi≠yi,
    passive optical means of making a time offset, capable of offsetting the optical signals S1 to SN in time with respect to the optical signal S0, and
    passive optical multiplexing means capable of multiplexing the optical signals offset in time.

2. The device of claim 1, wherein the passive optical division means comprise optical fiber couplers.

3. The device of claim 2, wherein the optical couplers are single-mode optical fiber couplers.

4. The device of claim 1, wherein the passive optical time offset means comprise N optical fibers.

5. The device of claim 4, wherein the N optical fibers are single mode.

6. The device of claim 1, wherein the passive optical multiplexing means comprise optical fiber couplers.

7. The device of claim 6, wherein the optical fiber couplers are single mode optical fiber couplers.

8. A system for measuring an optical signal comprising:
    the device for breaking down the dynamic range of an incident optical signal according to claim 1,
    means of photo detection of the optical signal for which the dynamic range was broken down by said device, said means of photo detection being capable of providing an electrical signal representative of the optical signal for which the dynamic range was broken down, and
    electronic means of processing the electrical signal, capable of reconstituting the incident optical signal.

9. The system of claim 8, wherein the electronic processing means include an oscilloscope or a digitizer.

10. The device of claim 1, wherein the input to a coupler Ci is optically connected to one of two outputs from a coupler Ci+1, for all values of i ranging from 1 to N−1, and the input to coupler CN corresponds to an input that receives the one incident optical signal, and signals S0 and S1 are respectively output by two outputs from coupler C1 and for all values of i varying from 1 to N, the signal Si being output by one of the two outputs from coupler Ci.

11. A system for measuring an optical signal, the system comprising the device for breaking down the dynamic range of one incident optical signal in accordance with claim 1, and means of photo detection of the optical signal for which the dynamic range was broken down, the means of photo detection being capable of providing an electrical signal representative of the optical signal for which the dynamic range was broken down.

12. A system for measuring an optical signal, the system comprising the device for breaking down the dynamic range of one incident optical signal in accordance with claim 1, and
    means of photo detection of the optical signal for which the dynamic range was broken down, the means of photo detection being capable of providing an electrical signal representative of the optical signal for which the dynamic range was broken down.

13. A system for measuring an optical signal, the system comprising the device for breaking down the dynamic range of one incident optical signal in accordance with claim 10, and
    means of photo detection of the optical signal for which the dynamic range was broken down, the means of photo detection being capable of providing an electrical signal representative of the optical signal for which the dynamic range was broken down.

14. A method for breaking down the dynamic range of one incident optical signal, the method comprising:
    using a passive optical means of division to divide the one incident optical signal into N+1 optical signals S0, S1, S2, ..., SN having different powers, wherein N is an integer equal to at least 2, each of these N+1 optical signals having an attenuation with respect to the incident optical signal, wherein the passive optical means of division comprises optical couplers C1, C2, ... CN−1, CN, each optical coupler Ci receiving an input optical signal having a power Pi and outputting two optical signals having powers xiPi and yiPi, respectively, with xi+yi being substantially 100% and xi≠yi,
    using a passive optical means of making a time offset to offset the optical signals S1 to SN in time with respect to the optical signal S0, and
    using a passive optical multiplexing means to multiplex the optical signals offset in time.

15. The method of claim 14, further comprising:
    photo detecting the optical signal for which the dynamic range was broken down, the photo detecting including providing an electrical signal representative of the optical signal for which the dynamic range was broken down so as to measure the one incident optical signal.

16. The method of claim 14, wherein each coupler has one input and two outputs, the input to a coupler Ci being optically connected to one of two outputs from a coupler Ci+1, for all values of i ranging from 1 to N−1, and the input to coupler CN corresponding to an input that receives the one incident optical signal, and signals S0 and S1 are respectively output by two outputs from coupler C1 and for all values of i varying from 1 to N, the signal Si being output by one of the two outputs from coupler Ci.

17. The method of claim 16, further comprising:
    photo detecting the optical signal for which the dynamic range was broken down, the photo detecting including providing an electrical signal representative of the optical signal for which the dynamic range was broken down so as to measure the one incident optical signal.

18. A device for breaking down the dynamic range of one incident optical signal, the device comprising:
    optical fiber couplers capable of dividing the one incident optical signal into N+1 optical signals S0, S1, S2, ..., SN having different powers, wherein N is an integer equal to at least 2, each of these N+1 optical signals having an attenuation with respect to the incident optical signal, wherein the optical fiber couplers comprise optical couplers C1, C2, ... CN−1, CN, each optical coupler Ci receiving an input optical signal having a power Pi and outputting two optical signals having powers xiPi and yiPi, respectively, with xi+yi being substantially 100% and xi≠yi, optical fibers configured to make a time offset, capable of offsetting the optical signals S1 to SN in time with respect to the optical signal S0, and optical fiber couplers capable of multiplexing the optical signals offset in time.

19. A method for breaking down the dynamic range of one incident optical signal, the method comprising:

using optical fiber couplers to divide the one incident optical signal into N+1 optical signals S0, S1, S2, ..., SN having different powers, wherein N is an integer equal to at least 2, each of these N+1 optical signals having an attenuation with respect to the incident optical signal, wherein the optical fiber couplers comprise optical couplers C1, C2, ... CN−1, CN, each optical coupler Ci receiving an input optical signal having a power Pi and outputting two optical signals having powers xiPi and yiPi, respectively, with xi+yi being substantially 100% and xi≠yi, using optical fibers configured to make a time offset to offset the optical signals S1 to SN in time with respect to the optical signal S0, and using optical fiber couplers to multiplex the optical signals offset in time.

* * * * *